United States Patent
Gilbert et al.

(10) Patent No.: US 7,581,068 B2
(45) Date of Patent: Aug. 25, 2009

(54) EXCLUSIVE OWNERSHIP SNOOP FILTER

(75) Inventors: Jeffrey D. Gilbert, Portland, OR (US);
Kai Cheng, Portland, OR (US); Liqun Cheng, Salt Lake City, UT (US)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 11/479,327

(22) Filed: Jun. 29, 2006

(65) Prior Publication Data
US 2008/0005485 A1    Jan. 3, 2008

(51) Int. Cl.
*G06F 13/00* (2006.01)
(52) U.S. Cl. ........................ 711/146; 711/141
(58) Field of Classification Search .................. None
See application file for complete search history.

(56) References Cited

U.S. PATENT DOCUMENTS

| | | | |
|---|---|---|---|
| 2004/0117561 A1* | 6/2004 | Quach et al. | 711/146 |
| 2006/0080508 A1 | 4/2006 | Hoover | |
| 2006/0224839 A1* | 10/2006 | Blumrich et al. | 711/146 |
| 2007/0294481 A1* | 12/2007 | Hoover et al. | 711/133 |

* cited by examiner

*Primary Examiner*—Kevin Verbrugge
*Assistant Examiner*—Eric S Cardwell
(74) *Attorney, Agent, or Firm*—Caven & Aghevli LLC

(57) ABSTRACT

A snoop filter maintains data coherency information for multiple caches in a multi-processor system. The Exclusive Ownership Snoop Filter only stores entries that are exclusively owned by a processor. A coherency engine updates the entries in the snoop filter such that an entry is removed from the snoop filter if the entry exits the exclusive state. To ensure data coherency, the coherency engine implements a sequencing rule that decouples a read request from a write request.

20 Claims, 3 Drawing Sheets

EXCLUSIVE OWNERSHIP SNOOP FILTER

BACKGROUND

1. Field

Cache coherency in a multi-processor system.

2. Description of Related Art

In a multi-processor system having multiple caches, each cache may have a copy of a piece of data stored in memory. Problems arise when multiple data copies in the caches are not coherent. Various techniques have been developed to ensure data coherency. For example, when the data in one cache is modified, other copies of the data are marked as invalid so that they will not be used.

A copy of data in the cache is often referred to as a cache line, a memory line, or a line. A snooping operation refers to the process in which an agent of a bus monitors the bus for memory transactions, e.g., a read/write operation to a main memory location which may also reside in a cache. The agent may record the states of the cache lines involved in the memory transactions in a directory, e.g., a snoop filter. The state of the cache line may indicate whether the line has only one valid copy outside of the main memory, has multiple valid copies shared by multiple caches, or has been invalidated. A data entry in the snoop filter is often indexed by its address in the main memory.

It is generally desired to have a large snoop filter that provides coverage many times of the total size of processor caches (e.g., 8× coverage, which is a term of art that indicates the snoop filter can hold information describing about eight times as many cache lines as the caches subject to the snoop filter can hold). A large snoop filter may increase the hit ratio of the processor caches and improve system performance. However, as the size of processor caches increases over time, circuit designers are hard pressed to provide even 1× coverage due to die size limitations. Thus, the snoop filter sometimes may run out of space to record the state of a line for a new memory transaction, and may need to evict an entry from the snoop filter to accommodate the new transaction. One an entry is evicted from the snoop filter, a back-invalidation message is sent to every processor cache that potentially holds a valid copy of the line associated with the evicted entry. Experiments show that a significant number of cache misses (e.g. 20%) are due to back invalidations of a cache line that was about to be used.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
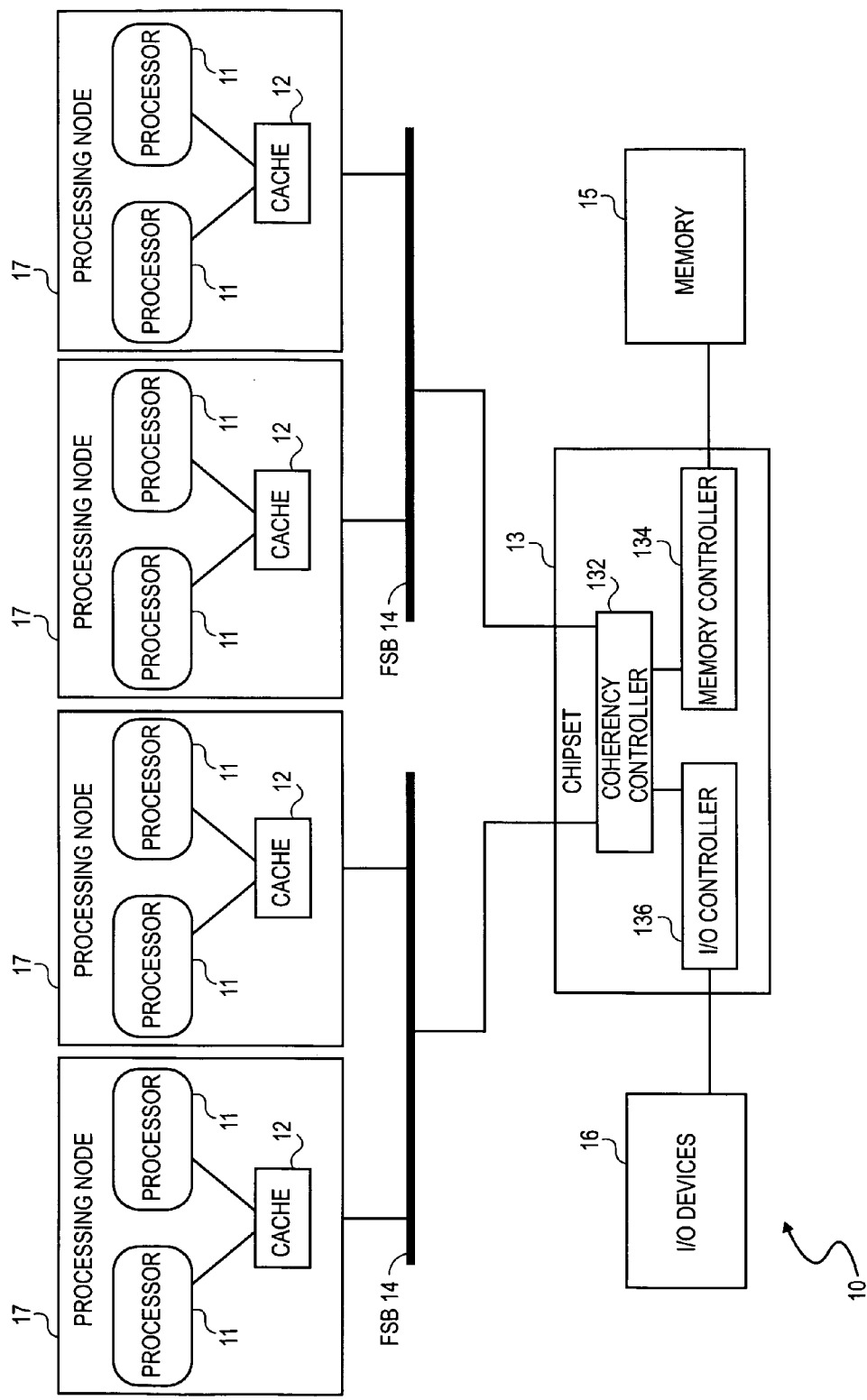
FIG. 1 is a block diagram of an embodiment of a multi-processor system including a plurality of caches.

Referring to FIG. 1, an embodiment of a multi-processor system 10 may comprise a plurality of processing nodes 17 interconnected with a chipset 13. Each of the processing nodes 17 may include one or more processors 11 (two processors per processing node are shown) and a cache 12. Each cache 12 may be locally accessible by processors 11 of a "home node" (the processing node in which this cache is located), and remotely accessible by processors 11 of "remote nodes" (the processing nodes other than the home node). Cache 12 is referred to as a "local cache" with respect to processors 11 of the home node. Processing nodes 17 may be coupled to chipset 13 via one or more front side buses (FSBs) 14 (only two FSBs are shown) or other types of datapaths (e.g., point-to-point connections). One or more of processing nodes 17 may be implemented on a single chip. System 10 may be used as a server system because of the high collective processing power it possesses. However, system 10 may also be used as desktop computers or any other computing systems.

Chipset 13 may include a coherency controller 132 for processing requests received from FSBs 14 and maintaining data coherency among caches 12. The functions of coherency controller 132 will be discussed in detail below with reference to FIG. 2. Chipset 13 may include a memory controller 134 for providing an interface for processing nodes 17 and other components of system 10 to access to storage locations of a memory 15. Memory 15 may comprise one or more types of memory devices such as, for example, dynamic random access memory (DRAM) devices, synchronous dynamic random access memory (SDRAM) devices, double data rate (DDR) SDRAM devices, or other volatile or non-volatile memory devices suitable for server or general applications. In some server applications, data bits stored on memory 15 may be error protected by an error-correction code (ECC).

Chipset 13 may also include an I/O controller 136 to provide an interface for processing nodes 11 and other components of system 10 to access to one or more I/O devices 16. I/O devices 16 may include Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications. In some embodiments, chipset 13 may be implemented as a single chip. In some embodiments, chipset 13 may be implemented as two or more chips. Chipset 13 may sometimes be referred to as a memory control hub (MCH) or as a North Bridge (NB). In multi-chip implementations, the secondary chips of chipset 13 may be referred to as an Input/Output hub (IOH), an Input/Output Controller hub (ICH), and/or as a South Bridge (SB).

Processors 11 may store lines of memory in their respective local caches 12 to facilitate quick access. Caches 12 may store data, instructions, or a combination of both. For each cache line, caches 12 may store a tag (e.g., a portion of a memory address) to associate or map the cache line to a corresponding line in memory 15. Caches 12 may also store and update a coherency state for each cache line. For example, caches 12 may support MESI coherency states in which a cache line may have a modified (M) state, an exclusive (E) state, a shared (S) state, or an invalid (I) state.

According to an example of a cache coherency protocol using MESI states, the invalid state (I) indicates that the associated cache line is not a current copy of the line. The current copy of the line may reside in memory 15 and/or one of the other caches 12 in the remote nodes. The shared state (S) indicates that the associated cache line is a current copy of the line, and that zero or more other caches 12 may also have a current copy of the line in the shared state. The exclusive state (E) indicates that the cache 12 in which the associated cache line resides has obtained ownership of the line and has a current copy of the line. Further, the E state indicates that no other cache 12 has a copy of the line in the M, E, or S state. The modified state (M) indicates that the cache 12 in which the associated cache line resides has a current copy of the line which has been modified. As with the E state, the M state indicates that no other cache 12 has a copy of the line in the M, E, or S state. Further, the M state indicates that the associated line may be more current than the corresponding data line in memory 15. As a line having either the M state or the E state is exclusively associated (e.g., owned or modified) with one of caches 12, the M state and the E state may be combined into an E/M state, sometimes also referred to as an exclusive state.

Figure 2:
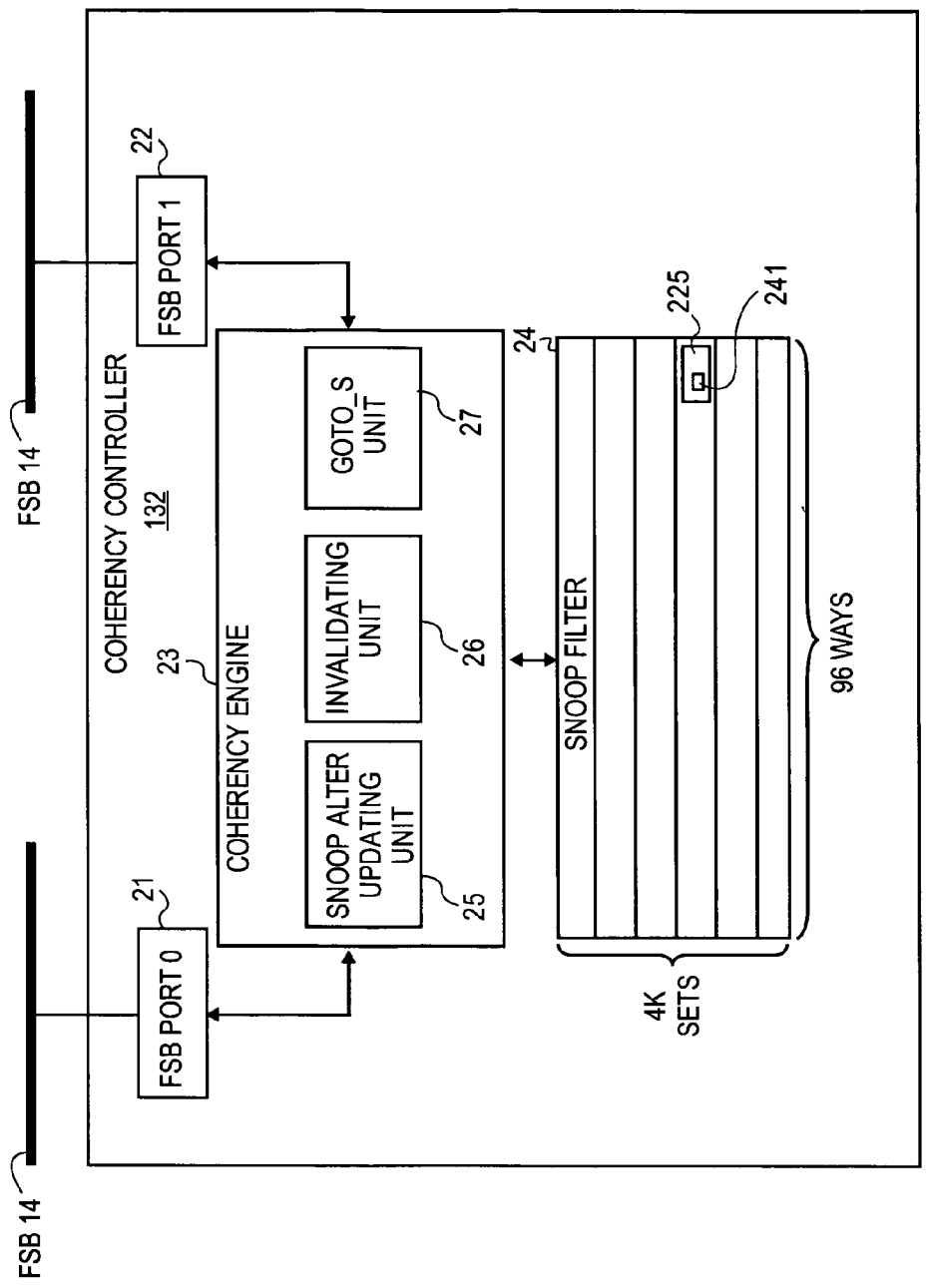
FIG. 2 is a block diagram of an embodiment of a coherency controller of the multi-processor system of FIG. 1, in which the coherency controller includes a snoop filter and a coherency engine.

The states of cache lines may be tracked by a centralized directory, e.g., a snoop filter or any other memory component in a centralized location of system 10. Referring to FIG. 2, in one embodiment, coherency controller 132 may include a snoop filter 24 to provide coherency information of the cache lines. As shown in FIG. 2, an embodiment of coherency controller 132 may comprise several FSB ports (FSB_Port_0 21 and FSB_Port_1 22), a coherency engine 23 and a snoop filter 24.

Snoop filter 24 may comprise one or more storage arrays such as, for example, a fully associative array, set associative array, or a directly mapped array that comprise ways or lines to store coherency information. In one embodiment, snoop filter 24 comprises a 96-way set associative array in which each of the 4K sets includes 96 slots (or ways) 225 (only one is shown) for storing coherency information of 96 cache lines. A cache line may be mapped to one of the 4K sets by, for example, using the last twelve bits of the memory address. Each way 225 may store information for a line. The information may include an address tag and a presence vector. The address tag may comprise all or a portion of the line's memory address. In the above example where the last twelve memory address bits are used to locate a set, the address tag may be the rest of the memory address bits preceding those twelve address bits. The presence vector may indicate which FSB 14 connects to the cache 12 that might have the cache line.

In one embodiment, snoop filter 24 may store only those entries that are associated with lines having the E/M state. Such snoop filter entries are sometimes referred to as E/M entries. That is, snoop filter 24 may store an E/M entry for a line if any cache 12 contains or may contain an exclusive copy of the line outside of main memory 15. Storing only the E/M entries may reduce the total number of entries stored in snoop filter 24 and may effectively expand the size of the snoop filter. As a tradeoff, storing only the E/M entries may cause the number of snoops generated by snoop filter 24 to increase. However, especially for read intensive applications, overall system performance generally improves.

In one embodiment, when a request for a memory transaction arrives at coherency controller 132, coherency engine 23 may determine where to forward the request. A memory transaction refers to a transaction that requires access to memory 15 or any caches 12. Coherency engine 23 may lookup snoop filter 24 to determine whether the snoop filter has information of the requested line. If snoop filter 24 has the information, coherency engine 23 forwards the request to the FSB port (21 or 22) connecting to the cache 12 that has a current copy of the line based on the presence vector of the line. If the transaction might potentially change the state of the requested line, coherency engine 23 updates the information in snoop filter 24 to reflect the changes. If snoop filter 24 does not have information for the line, coherency engine may add an entry to the snoop filter to record coherency information of the requested line.

To support the E/M only storage in snoop filter 24, coherency engine 23 implements a sequencing rule to maintain data coherency. The sequencing rule decomposes the memory request types into read requests and write requests. Read requests are decoupled from write requests. Both processors 11 and I/O devices 16 (FIG. 1) may issue the read requests and the write requests. For processor requests, write requests may include write (a.k.a. read for ownership) and write-invalidate. For each request type, different coherency actions are taken in the cases of a snoop filter hit and a snoop filter miss. Coherency engine 23 may implement the sequencing rule by hardware or embedded firmware.

TABLE 1

E/M Only Snoop Filter Sequencing Rule

| Request Type | Snoop Filter Result | Snoop Filter Action | Coherency Action |
| --- | --- | --- | --- |
| Processor Read | Hit | Remove entry | "Goto_S" Snoop of the current owner |
|  | Miss | None | None |
| Processor Write (Read for Ownership) | Hit | Update owner | Invalidating snoop to the current owner |
|  | Miss | Allocate entry | Invalidating snoop of all agents |
| Processor Write-invalidate | Hit | Remove entry | Invalidating snoop to the current owner |
|  | Miss | None | Invalidating snoop of all agents |
| I/O DMA Read | Hit | Remove entry | "Goto_S" Snoop of the current owner |
|  | Miss | None | None |
| I/O DMA Write | Hit | Remove entry | Invalidating snoop to the current owner |
|  | Miss | None | Invalidating snoop of all agents |

An example of the sequencing rule is described with reference to Table 1. For each request type (e.g., read or write) and for each snoop filter result (e.g., hit or miss), coherency engine 23 takes a snoop filter action and a coherency action to maintain data coherency. A snoop filter action refers to an action of updating the snoop filter entries. A coherency action refers to an action of sending a snoop message to one or more processors to update the coherency states of the cache lines. In one embodiment, coherency engine 23 may comprise circuits including a snoop filter updating unit 25, an invalidating unit 26, and a Goto_S unit 27 for implementing the snoop filter actions and the coherency actions.

For example, assume that a processor requests to read a line from the main memory and the request results a hit in snoop filter 24. A hit in snoop filter 24 means that the entry is in an exclusive state (E/M) and the associated line is currently owned by a processor cache. Thus, the new read request from another processor will cause the line to exit the E/M state and enter the S state. As snoop filter 24 only stores E/M entries, the newly requested entry, now in the S state, should be removed from the snoop filter. Thus, snoop filter updating unit 25 directs snoop filter 24 to remove that entry from the snoop filter. Further, Goto_S unit 27 sends a "Goto_S" snoop message to inform the current owner of the line that the line has become shared. Thus, the current owner may change the state of the line from E/M to S.

If the read request results in a miss in snoop filter 24, the requested entry may be currently owned by zero or more caches. The current copy in the main memory is up-to-date and the new read request does not change that current state. Thus, snoop filter 24 is not updated and no coherency action is taken.

If the processor requests to write a line to the main memory and the request results in a hit in snoop filter 24, snoop filter updating unit 25 updates the snoop filter entry to indicate that the requesting processor is the new owner of the line. Snoop filter 24 keeps the entry because the entry is still in the E/M state, although the exclusive ownership has changed. Invalidating unit 26 sends an invalidating message to the current owner of the line to indicate that the current local copy is no longer up-to-date. Thus, exclusive access right is granted to the requesting processor and the copy owned by the current owner is invalidated.

Assume that the processor requests to write a line to the main memory and the request results in a miss in snoop filter 24. A miss indicates that the line is not exclusively owned by any processors. Because the write request will cause the line to be exclusively owned by the requesting processor, snoop filter updating unit 25 allocates a snoop filter entry to the requested line. The copies of the line that are possibly cached outside of the main memory are invalidated. Thus, invalidating unit 26 issues an invalidating message to all of the processors to indicate that the current local copies are no longer up-to-date. As a result, exclusive access right is granted to the requesting processor.

In another scenario, the processor may request to write-invalidate a line. A write-invalidate operation is a write operation to the main memory in addition to invalidation of all copies in the processor's local cache. After the write-invalidate, the main memory holds the only current copy in the system. Thus, the associated snoop filter entry, if any, is deleted to signify that the entry is no longer exclusively owned by the current owner. Thus, if the write-invalidate request results in a hit in snoop filter 24, invalidating unit 26 sends an invalidating message to the current owner. If the write-invalidate request results in a miss, invalidating unit 26 sends an invalidating message to all of the processors to indicate that the copies outside of the main memory are no longer up-to-date. The result of the write-invalidate request is that no cache 12 has a copy of the line.

An I/O device may sometimes initiate a direct memory access (DMA) read request. An I/O DMA read request is handled in the same manner as a processor read request. Thus, if there is a hit in snoop filter 24, the associated snoop filter entry is removed and the copy owned by the current owner is changed to the S state. If there is a miss, no snoop filter action or coherency action is taken.

If the I/O device initiates a DMA write request and the request results in a hit, snoop filter updating unit 25 removes the entry to indicate that the associated line is no longer in the E/M state. An invalidating message is sent to the processor that currently owns the line. If the request results in a miss, an invalidating message is sent to all the processors because each one of them may potentially owns a copy of the line. The I/O transfer occurs after the coherency action is completed.

Figure 3:
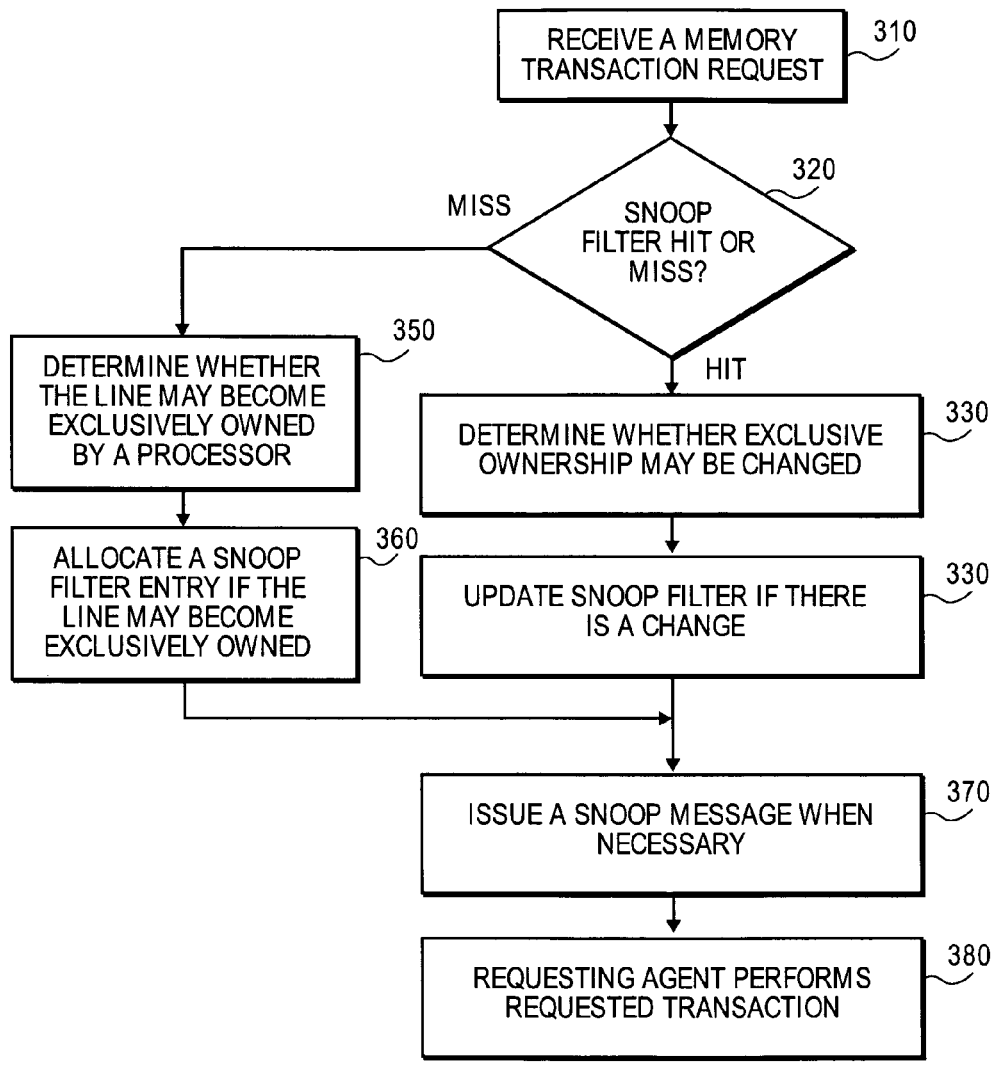
FIG. 3 is an example of a flow chart showing a process of sequencing rule implemented by the coherency engine of FIG. 2.

An example process performed by coherency engine 23 is shown in FIG. 3. Referring also to FIG. 1, at block 310, coherency engine 23 receives a request from one of processors or I/O devices for a memory transaction. At block 320, coherency engine 23 looks up snoop filter 24 to determine if the requested line has an entry in the snoop filter. If there is an entry for the requested line in snoop filter 24, at block 330, coherency engine 23 determines if the request may change the exclusive ownership of the entry. At block 340, coherency engine 23 updates the snoop filter entry if there is a change to the exclusive ownership. Coherency engine 23 does not update snoop filter 24 if there is no change to the exclusive ownership. Return to block 320, if requested line does not have an entry in snoop filter 24, coherency engine 23 determines if the request may cause the line to become exclusively owned by a processor at block 350. If the line will become exclusively owned by a processor, at block 360, coherency engine 23 allocates an entry to the requested line. Coherency engine 23 does not update snoop filter 24 if the line will not become exclusively owned by a processor.

At block 370, except for the situation in which the requested transaction is a read that results in a miss, coherency engine 23 issues a snoop message to one or more processors. The snoop message may be a "Goto_S" message that informs a current owner of a line that the line has changed into the S state. The snoop message may be an invalidating message that informs a current owner of a line that the line is no longer valid. The snoop message may be sent to a current owner of a line, or in some scenarios, to all of the processors if some of them may own a copy of the line. The type of snoop message and the destination of the snoop message may depend on the request type and the snoop filter result (e.g., a hit or a miss). At block 380, after the snoop message is sent, the requesting agent may proceed to perform the requested transaction.

In the foregoing specification, specific embodiments have been described. It will, however, be evident that various modifications and changes can be made thereto without departing from the broader spirit and scope of the appended claims. The specification and drawings are, accordingly, to be regarded in an illustrative rather than a restrictive sense.

What is claimed is:

1. A method comprising:
   storing, in a snoop filter, only entries that have an exclusive state; and
   updating an entry in the snoop filter if a request changes an exclusive ownership of a line associated with the entry.

2. The method of claim 1 further comprising:
   decoupling a read request from a write request in updating the snoop filter.

3. The method of claim 1 wherein updating an entry comprises:
   removing the entry in the snoop filter if a read request resulting in a hit is received.

4. The method of claim 1 wherein updating an entry further comprises:
   changing an owner of the line if a processor write request results in a hit.

5. The method of claim 1 wherein updating an entry further comprises:
   allocating a new entry in the snoop filter to a processor if the processor issues a write request that results in a miss.

6. The method of claim 1 wherein updating an entry further comprises:
   removing the entry in the snoop filter if a direct memory access (DMA) request results in a hit in the snoop filter.

7. The method of claim 1 further comprising:
   sending an invalidating message to all processors whose cache lines are tracked by the snoop filter if a write request results in a miss.

8. The method of claim 1 further comprising:
   sending an invalidating message to a current owner of the line if a write request results in a hit.

9. An apparatus comprising:
   a plurality of processors;
   a snoop filter coupled with the plurality of processors, the snoop filter storing only entries that have an exclusive state; and a coherency engine to update the entries in the snoop filter.

10. The apparatus of claim 9 wherein the coherency engine comprises:
   circuits to implement a sequencing rule that decouples a read request from a write request.

11. The apparatus of claim 9 wherein the coherency engine further comprises:
   a snoop filter updating unit to remove an entry from the snoop filter if a read request resulting in a hit is received by the coherency engine.

12. The apparatus of claim 11 wherein the coherency engine further comprises:
   a circuit to change an exclusive state of a line to a shared state if the read request results in a hit.

13. The apparatus of claim 9 wherein the coherency engine further comprises:
   an invalidating unit to send an invalidating message to at least one processor if a write request resulting in a miss is received by the coherency engine.

14. The apparatus of claim 9 wherein the plurality of processors comprise:
   a plurality of caches supporting a cache coherency protocol using MESI (modified, exclusive, shared, or invalid) states.

15. The apparatus of claim 9 further comprising:
   a plurality of input/output (I/O) devices coupled with the snoop filter to issue direct memory access (DMA) requests.

16. A system comprising:
   a plurality of processors;
   a server memory, wherein a portion of the server memory is cached by the plurality of processors;
   at least one server input/output (I/O) device to receive and respond to external requests; and
   a chipset including:
      a snoop filter to store only entries that have an exclusive state; and
      a coherency engine to update the entries in the snoop filter.

17. The system of claim 16 wherein the coherency engine comprises:
   circuits to implement a sequencing rule that decouples a read request from a write request.

18. The system of claim 16 wherein the coherency engine further comprises:
   a snoop filter updating unit to remove an entry from the snoop filter if a read request resulting in a hit is received by the coherency engine.

19. The system of claim 18 wherein the coherency engine further comprises:
   a circuit that changes an exclusive state of a line to a shared state if the read request results in a hit.

20. The system of claim 16 wherein the coherency engine further comprises:
   an invalidating unit to send an invalidating message to at least one processor if a write request resulting in a miss is received by the coherency engine.

* * * * *